(12) United States Patent
Subratie (10) Patent No.: US 8,903,236 B2
(45) Date of Patent: Dec. 2, 2014

(54) CAMERA MATTE BOX

(71) Applicant: Andrew Subratie, Surry (GB)

(72) Inventor: Andrew Subratie, Surry (GB)

(*) Notice: Subject to any disclaimer, the term of this patent is extended or adjusted under 35 U.S.C. 154(b) by 0 days.

(21) Appl. No.: 13/861,595

(22) Filed: Apr. 12, 2013

(65) Prior Publication Data

US 2013/0272689 A1    Oct. 17, 2013

(30) Foreign Application Priority Data

Apr. 13, 2012    (GB) .................................. 1206586.8

(51) Int. Cl.
*G03B 11/00* (2006.01)
*G03B 11/04* (2006.01)
*G03B 17/56* (2006.01)

(52) U.S. Cl.
CPC .............. *G03B 11/00* (2013.01); *G03B 11/045* (2013.01); *G03B 17/566* (2013.01)
USPC ........................................................ 396/544

(58) Field of Classification Search
CPC ...................................................... G03B 17/12
USPC .................. 396/241, 544; 348/373–376, 360; 359/819
See application file for complete search history.

(56) References Cited

U.S. PATENT DOCUMENTS

| | | | |
|---|---|---|---|
| 4,669,846 A | 6/1987 | Koch et al. | |
| 4,687,312 A * | 8/1987 | Navarro | ......................... 396/544 |
| 4,901,098 A | 2/1990 | Salles | |

FOREIGN PATENT DOCUMENTS

| | | |
|---|---|---|
| CH | 258866 | 6/1949 |
| FR | 2524152 | 9/1983 |
| GB | 2074330 A | 10/1981 |
| WO | WO 03058316 A1 | 7/2003 |

OTHER PUBLICATIONS

British Search Report, Application No. GB1206586.8, dated Jul. 31, 2012, mailed Aug. 1, 2012.

* cited by examiner

*Primary Examiner* — WB Perkey
*Assistant Examiner* — Minh Phan
(74) *Attorney, Agent, or Firm* — Fay Sharpe LLP (57) ABSTRACT

A matte box system for a camera is presented, including one or more filter rings each capable of accommodating a filter or filter holder, the filter rings each having a substantially planar forward face and a substantially planar rear face, one face having one or more bearing elements and the other face having a corresponding bearing surface adapted to engage with the bearing element. The bearing surface includes one or more circular or arcuate channels, and the bearing element including a spring-loaded or otherwise biased surface that protrudes from the face and is urged in a generally axial direction to engage with the bearing surface such that the bearing surface and bearing element of consecutive filter rings allow the filter rings to independently rotate about the optical axis, while resisting radial movement of the filter rings.

15 Claims, 11 Drawing Sheets

CAMERA MATTE BOX

CROSS-REFERENCE TO RELATED APPLICATIONS

This application claims priority to and the benefit of Great Britain Patent Application No. GB1206586.8, filed Apr. 13, 2012 the entirety of which is hereby incorporated by reference as if fully set forth herein.

The present specification relates to a camera matte box, that is, an assembly for shielding the front lens from unwanted glare and also for holding one or more filters in front of a camera, particularly though not exclusively a motion picture camera.

Originally developed to hold 'mattes' to block out areas of an image, matte boxes are now more usually used to hold filters in front of a camera lens. Particularly when shooting motion pictures or videos, a camera man may wish to use several filters, such as color tints or polarizing filters, at the same time. For polarizing filters, it is also desirable that the filters should be rotatable about the camera's optical axis. This can also be desirable for other filters, such as graduated filters. The filters are often mounted on a rectangular stage, so that they may be slid into the matte box.

A typical matte box can be seen in U.S. Pat. No. 4,901,098 (Salles). A number of filter stages are held between a front ring and a back ring, the front ring's position being secured on iris rods so that the filter stages are clamped together. Each filter stage comprises a ring body into which a filter holder body can be inserted. The filter stages and other parts features stepped lips around their circumference, so that one stage fits inside the next stage.

Since the back ring, filter stages and front ring are forward of the camera lens, the angle of view may be reduced (known as vignetting), depending on the distance from the lens and the internal diameter of the parts. Larger diameter parts may be used, but this increases the cost and complexity. For this reason, matte boxes are often assembled with the minimum number of filter stages that will be needed, so that the angle of view is not unnecessarily reduced. Therefore, although the filter holders can be removed with comparative ease, assembling and disassembling the matte box to release the iris rods is necessary in order to add or remove filter stages. On a movie set, the time such assembly and disassembly takes can be very costly.

US2005190461 (Petroff) shows a matte box assembly in which the ring bodies (referred to as 'filter holder guide assembly' therein) that hold the filter holders feature spring loaded sliding ribs, so that several filter stages can be assembled and disassembled with comparative ease.

Such a design though increases the thickness and reduces the inner diameter of the filter stages, reducing the viewing angle. Assembly and disassembly still requires considerable dexterity. The ease with which the parts can be assembled and disassembled is also very dependent on the tolerance to which the parts are made.

The present invention aims to provide a matte box that is easy to assemble and disassemble. Another aim of the invention is to provide a matte box having a wide angle of view.

According to the present invention, there is provided a matte box system for a camera, including one or more filter rings each capable of accommodating a filter or filter holder, the filter rings each having a substantially planar forward face and a substantially planar rear face, one face having one or more bearing elements and the other face having a corresponding bearing surface adapted to engage with the bearing element, the bearing surface including one or more circular or arcuate channels, and the bearing element including a spring-loaded or otherwise biased surface that protrudes from the face and is urged in a generally axial direction to engage with the bearing surface such that the bearing surface and bearing element of consecutive filter rings allow the filter rings to independently rotate about the optical axis, while resisting radial movement of the filter rings.

According to another aspect of the present invention, there is provided a matte box system for a camera, including one or more filter rings each capable of accommodating a filter or filter holder, the filter rings each having a two catch means situated on opposite sides of the filter ring, each catch means including a moveable element that engages with an adjacent filter ring such that consecutive filter rings are releasably secured to each other.

The invention will now be described, by way of example, with reference to the drawings, of which

References to forward and cognate terms such as front, are used herein to designate the direction that the camera lens receives light from, and references to backward and rear designate the opposite direction. The use of the term axis, and axial, refer to the optical axis.

Figure 1:
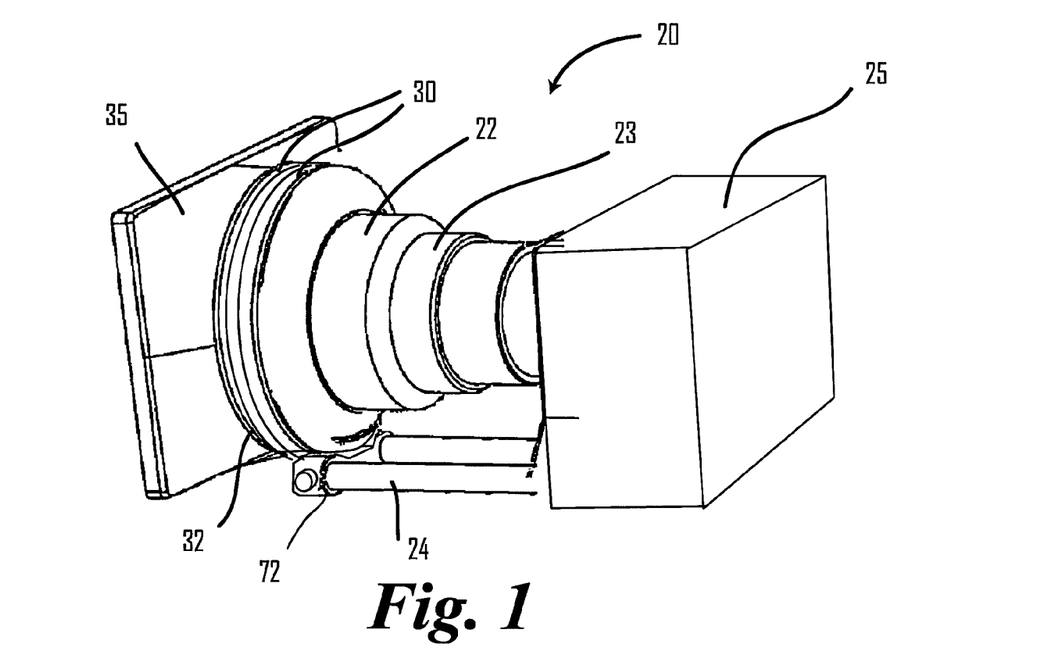
FIG. 1 shows a diagrammatic perspective view of the matte box attached to a camera.

Referring to FIG. 1, the matte box 20 is mounted on a camera 25 by means of a donut ring 22 which engages with the forward part of the lens system 23 of the camera 25, and upon the camera's iris rods 24. A number of filter stages 30 are interposed between a front ring 32 and the donut ring 22. A sunshade 35 may be attached to the front ring 32.

Figure 2:
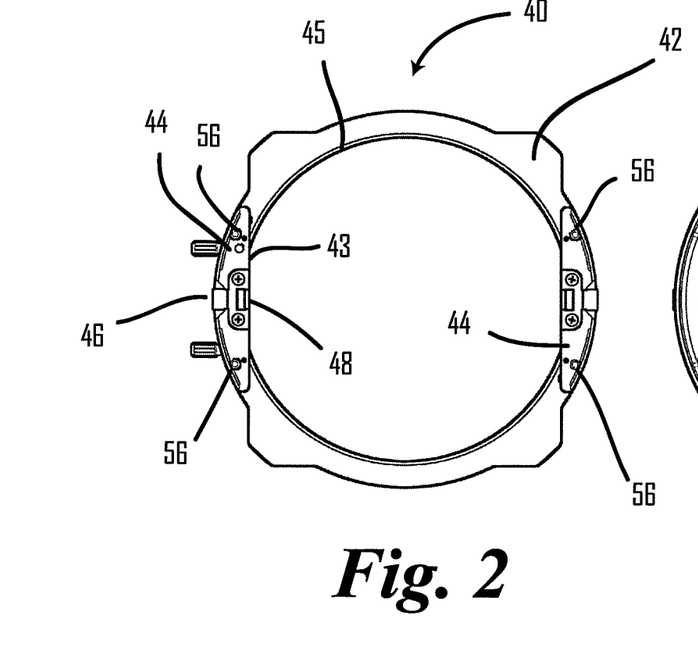
FIG. 2 shows a front elevation of a filter ring body
Figure 3:
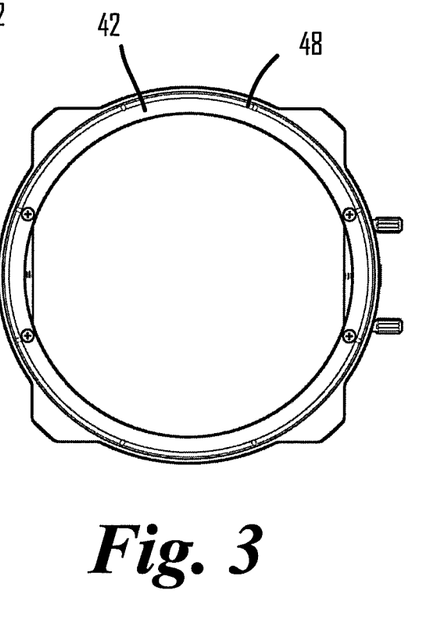
FIG. 3 shows a rear elevation of the filter ring body
Figure 4:
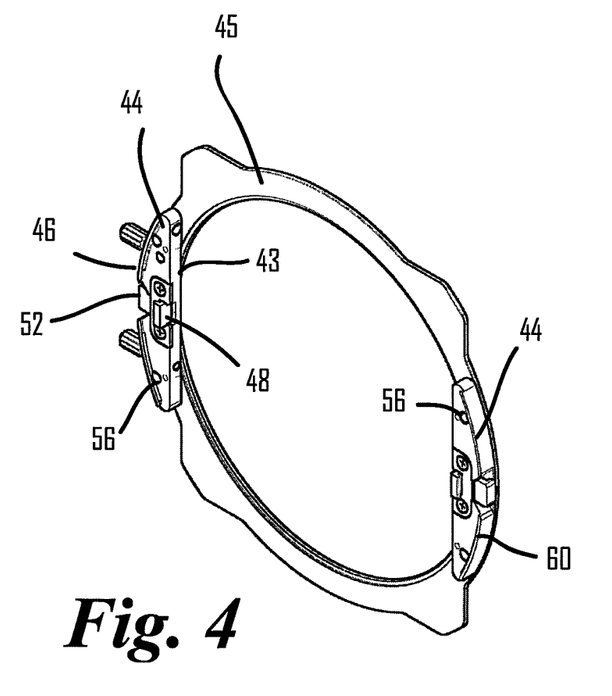
FIG. 4 shows a perspective view of the filter ring body

The engagement between adjacent filter stages will be explained first; the engagement between the donut ring and the first filter stage, and the last filter stage and the front ring (if used) may use the same principle. Referring to FIGS. 2 to 4, the filter stage includes a filter ring body 40 which comprises a ring 42 having to filter guides 44 on opposite sides of the ring 42. As can also be seen clearly in FIG. 6, each filter guide 44 has a straight inwardly facing edge 43, so that when two filter ring bodies are placed together a volume is defined between the two filter guides 44 of one filter holder 40, and the rings 42 of the two filter ring bodies, such that a rectangular filter holder body may be slid between the filter ring bodies and held in position.

The filter guides may also include one or more bearings to reduce friction and locate the filter holder as is conventional.

Figure 5:
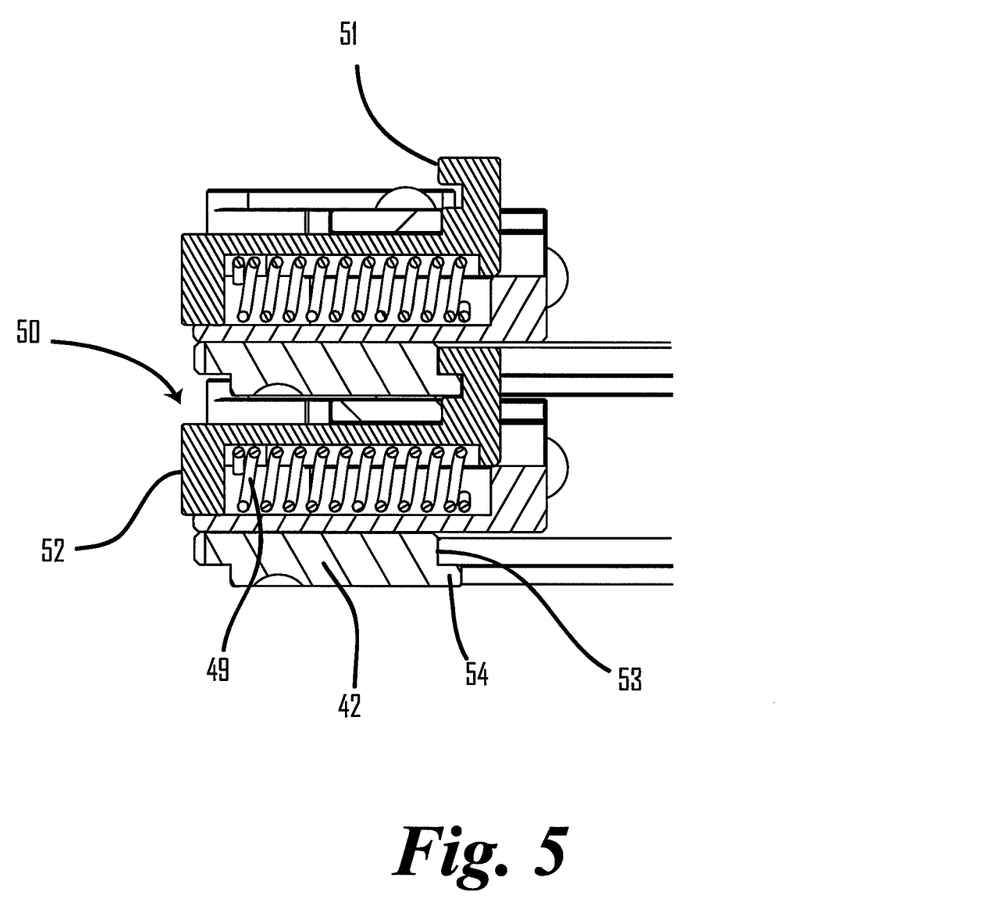
FIG. 5 shows a radial sectional view of two filter ring bodies

Referring to FIG. 5, each filter guide includes a catch assembly 50, which is radially outwardly biased by a spring 49. The catch assembly 50 includes a button 52 formed at the assembly's distal end that protrudes from the filter guide 44, and a catch 51 formed on the proximal end of the catch assembly 50. The aperture of the filter ring 42 has a stepped profile, so that a lip 54 extends radially inwardly from the ring's main bore 53. One filter ring 42 may be secured to another by depressing both buttons 52 of one filter ring 42 and locating it against the other filter ring, and then releasing the buttons 52. While the buttons 52 are depressed, the catches 51 of the first filter ring are displaced radially inwardly, and clear the lip 54 of the second filter ring. On releasing the buttons 52, the catches 51 move radially outward, engaging with the lip 54 so that the two filter rings are secured together.

Figure 6:
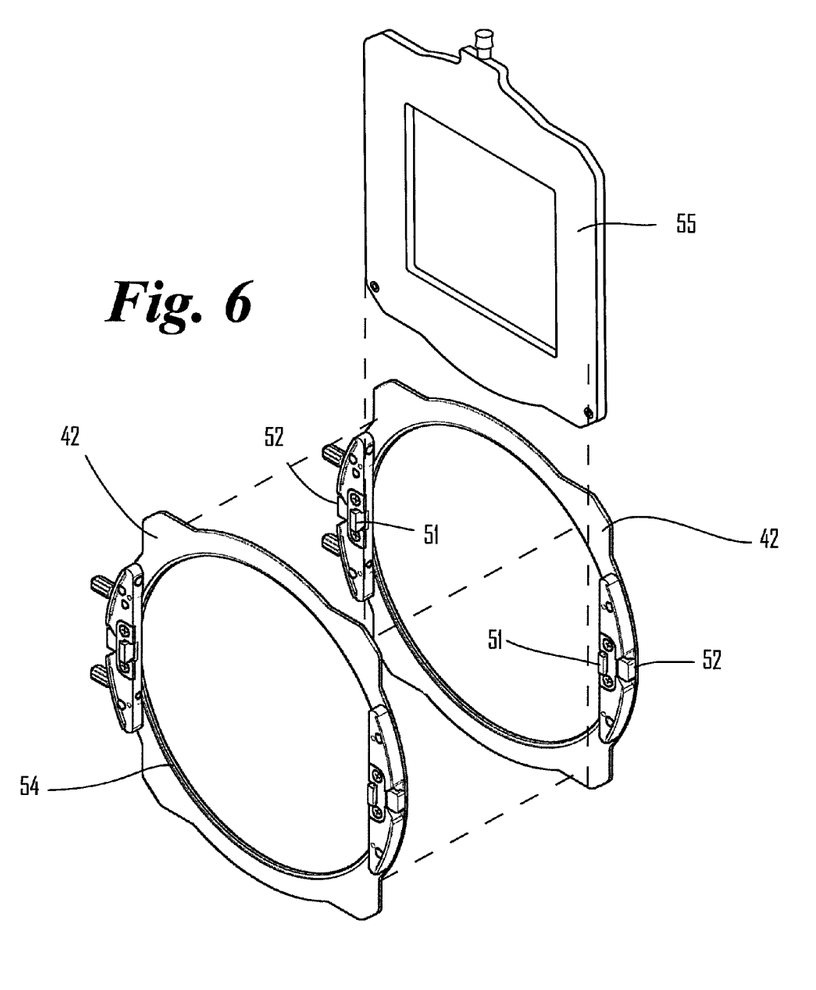
FIG. 6 shows an exploded perspective view of two filter ring bodies and a filter tray

This process can be seen in FIG. 6, with the dotted lines indicating the progress of the two filter rings 42 as they are brought together, the depression of the buttons 52 on one filter ring 42 causing the catches 51 to clear the lip 54, and release of the buttons securing the two filter rings together. A rectangular filter holder 55 may then be slid into the slot formed between the two filter rings 42.

Figure 7:
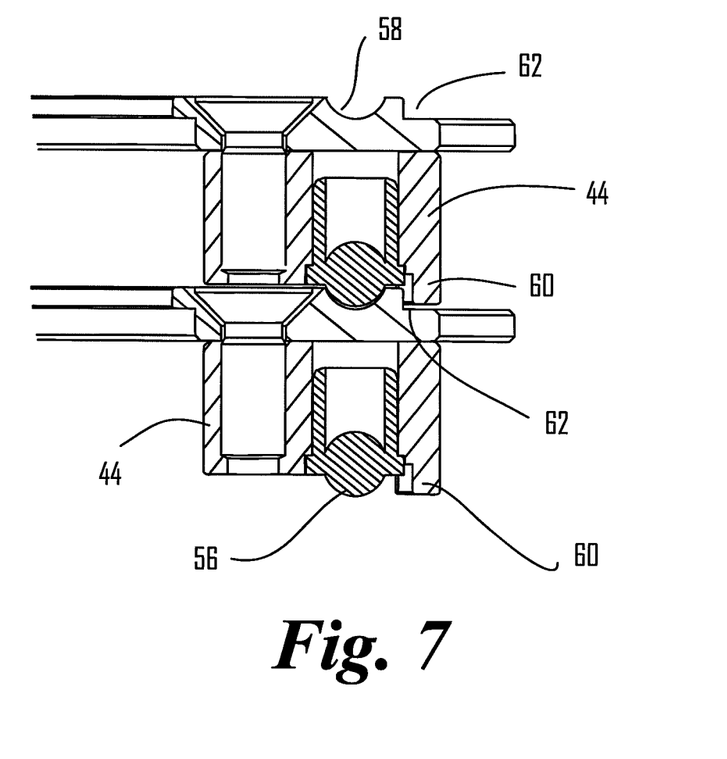
FIG. 7 shows a different radial sectional view of two filter ring bodies

Referring to FIG. 7, as previously mentioned, each filter ring should be free to freely rotate about the optical axis, independently of the other filter rings or other parts of the matte box or camera. To this end, each filter guide 44 includes two bearings 56. On the reverse side of the filter ring 42, there is a circular race 58 on the rearward-facing annular planar surface. When two filter rings are placed together and secured as described, the bearings 56 of one filter ring 42 engage with the circular race 58 of the other filter ring 42. The bearings both reduce friction as the filter rings are rotated relative to one another, and they constrain both filter rings against any radial translation.

The bearings 56 are biased with a spring (not here shown) so that they are urged into the race. Ideally they have a spherical or hemi-spherical portion, though other forms or shapes such as rollers could also be used; similarly, the profile of the race is ideally hemispherical but could be varied. They may be made of any suitable low friction material such as stainless steel or PTFE. Ideally, the spring will be of the helical type, but other types may be adapted. In fact, any structure that can store energy under compression so as to allow the bearing to be pressed back into its filter stage while providing a restoring force back out of the filter stage in a generally axial direction so as to engage with the race can be used with the bearing. For example, a block of resilient elastomer could be positioned behind the bearing. The bearing could even include or be composed of such a resilient material, so that it urged itself into the race of the other filter stage. The race may also feature some resilience or spring-loading.

The catch assembly 50 could be spring-loaded or biased in a similar manner.

The bearings ideally are all radially spaced from the optical axis by the same amount, so that they all the bearings engage the same circular race. If only a small angle of rotation of the filter stage is required, the race could be composed of separate arcs lying on a single circle, but a complete circle will usually be the optimal path for the race.

The arrangement of the bearings and race could be reversed, so that the race is forward facing and the bearings are urged in a backward facing direction.

Providing the bearings and race on opposite faces (the planes of these faces being parallel to the optical axis, and the urging of the bearings being substantially parallel to the optical axis) avoids unnecessarily increasing the diameter of any of the filter rings.

The filter guides 44 also feature rim portions 60. Considered from the optical axis, these backward facing projections lie on short arcs on the circumference of the filter ring 42. The forward face of the filter ring features a small step 62 on the outer edge along the entire circumference, with which the rim portions 60 engage. The rim portions 60 and circumferential step 62 may not in all cases be necessary, but they are provided to supplement the constraint provided by the bearings 56 and race 58.

Now the attachment means between the separate filter stages has been explained, and referring back to FIG. 1, it will be seen that it is suited to being attached on iris rods in a similar manner to known matte boxes. The frontmost filter ring is attached to a front ring 32 or front plate, to which in turn the sunscreen 35 is attached. The front ring incorporates an iris block 72 which slidably engages with the iris rods 24. The whole filter ring assembly is thus supported on the iris rods via the front ring 32. The filter assembly may be slid backwards towards the lens assembly, and the donut ring 22 brought up to or around the frontmost part of the lens assembly to provide a light seal by some known means such as a flexible silicon rubber ring.

The donut ring may also feature filter guides 44 similar to those described for the filter rings 32, that is, having rim portions 60 and bearings 56 that engage with the filter ring 32 in front of the donut ring, and catch assembly to fix the first filter ring to. Similarly, the front ring 32 will ideally feature a race 58 to engage with the bearings 56 of the filter ring immediately behind the front ring, and a lip to engage with the catch assembly of the frontmost filter ring. It will also be seen that a filter ring could feature the necessary diameter and adapter to fit directly to the lens assembly or to the sunscreen.

The embodiments described above have bearings 56 facing forwards to engage with a backwards-facing race 58. It will be realized that this orientation could straightforwardly be reversed. Similarly, where catch assemblies are used, the catch assemblies are mounted facing forward to engage with the rear face of the filter ring in front, and again this orientation could be reversed.

The catch assembly allows the filter rings to be assembled and disassembled quickly. Dividing the catch assembly into two parts allows both parts to be smaller, that is, to impinge less radially towards the optical axis, thus maintaining a wide viewing angle.

The bearing and race system allows a wider angle of viewing than some prior art systems, because the race and bearing being situated on opposing faces allows the filter rings to be thinner than known filter rings relying on adjacent rings having interlocking concentric rings of lips and steps; for example usually the outer ring has a lip on its inner radius and the inner ring has a corresponding lip on its outer radius. Since the individual filter rings are thinner, the length of the filter stage is correspondingly shortened, the front ring brought closer to the camera's lens assembly, and the viewing angle increased.

The catch assembly and bearing and race system are complimentary, since the filter guides provide a structure for both. However, the bearing and race system may be implemented separately, and such a system will now be described.

Figure 8:
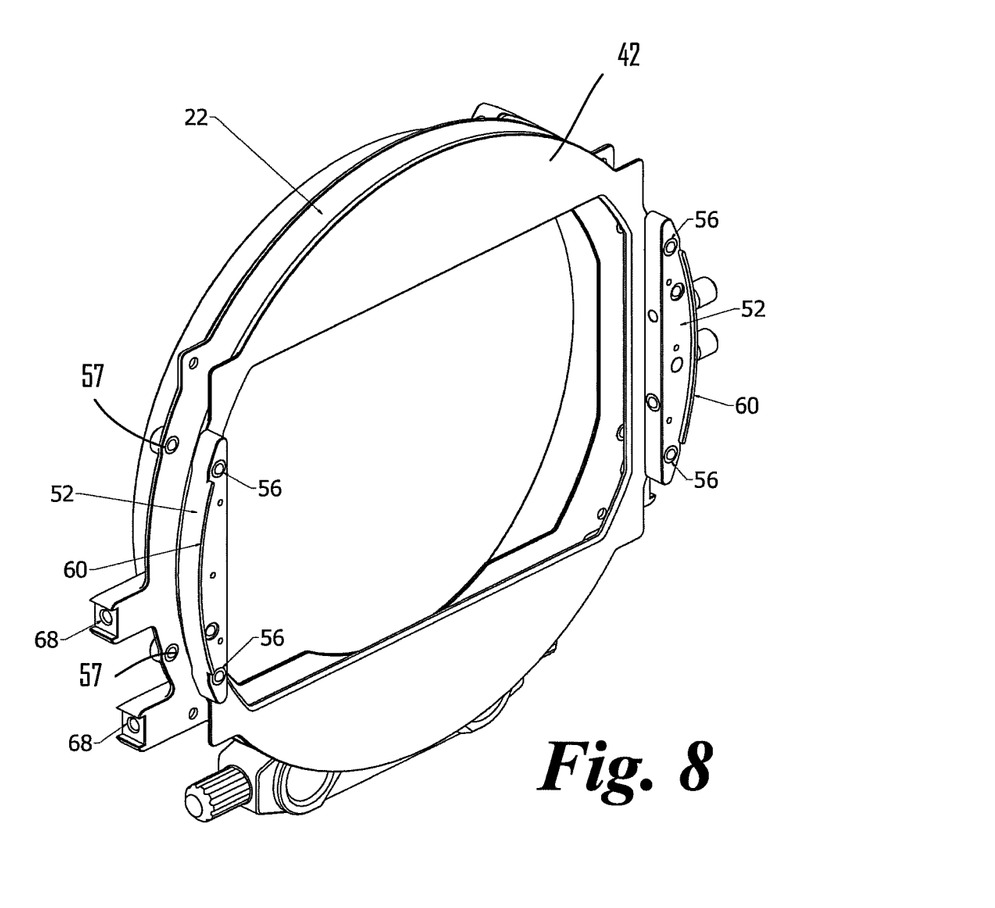
FIG. 8 shows a perspective view of a donut ring and a filter ring body

Referring to FIG. 8, here the donut ring 22 includes bearings 57, which work in the same way as the bearings 56 on the filter rings 42, and engage with the circular race of the filter ring 42 placed immediately in front of the donut ring, so that the filter ring can rotate relative to the donut ring. Four brace supports 68 are distributed protruding from the circumference of the donut ring 22. It will also be seen that there is no catch assembly present on the filter guides 44. Instead, the filter rings are held in place by the clamping of the donut ring 22 to the sunshade 35, as described in more detail below.

Figure 9:
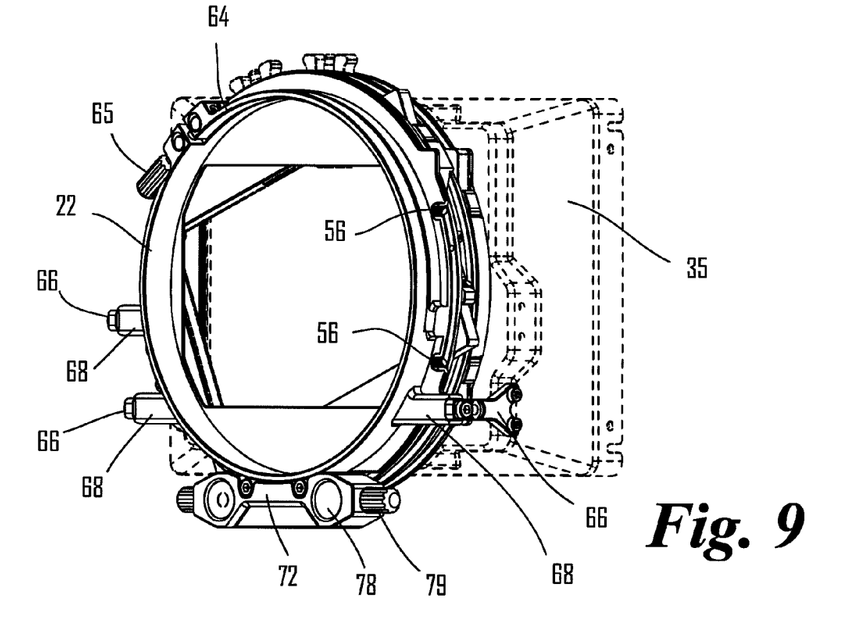
FIG. 9 shows a perspective view of another embodiment of the matte box

The use of such filter rings with the bearing and race means, but without the quick release catch assembly is suited to being supported on the lens in a manner similar to known lightweight matte boxes. Referring now to FIG. 9, the donut ring 22 features a split strip portion 64 whose end is attached to the main body of the donut ring 22 by a threaded thumbwheel 65 that engages both the split strip portion 64 and the main body of the donut ring. The donut ring is tightened to the camera lens assembly by this means, though of course alternative or supplementary clamping or attachment methods could be used. For example, an iris block 72 may be attached to the bottom of the donut ring 22, and include apertures 78 to accommodate iris rods 24, which would then be secured with threaded thumbwheels 79.

Figure 10:
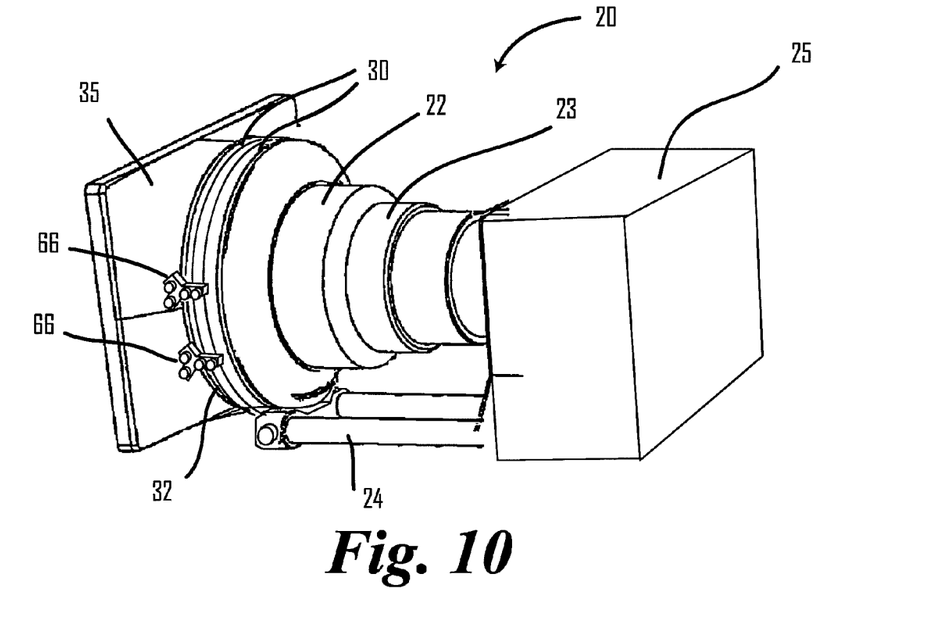
FIG. 10 shows a diagrammatic perspective view of this embodiment of the matte box attached to a camera

One end of four Y-shaped braces 66 (only three of which are shown, a cut-away portion being shown where the fourth would be situated) are attached to each of the brace supports. As before, the required number of filter rings are placed in front of the donut ring, and a front ring 32 (if necessary) and sun shade 35 in front of the filter rings (as also shown generally in FIG. 10). In this case though, the filter rings, like the donut ring, feature the bearing and race system, and the rim portion and step, as described for FIGS. 1 to 8, but without the catch assembly. The free end of the Y-shaped braces 66 are attached to the sunshade 35. As shown in FIG. 9, the position of the Y-shaped braces 66 is adjustable, in this embodiment the Y-shaped braces 66 features two holes so that each brace 66 may be fixed to the corresponding brace support 68 in one of two positions so that either one or two filter rings may be held securely between the donut ring 22 and the sunshade 35. Y-shaped braces featuring more than two holes could of course be provided, capable of being adjusted in discrete steps to accommodate different permutations of filter rings.

The Y-shaped braces 66 attached to the sunshade 35 thus prevent any movement of the filter rings along the optical axis. One end of such a brace system could also be fitted to the camera itself to secure the filter rings in front of the lens assembly.

Such a system takes somewhat longer to assemble and disassemble than one with a catch assembly on each filter guide. However, it is still quicker to add stages than some known systems. Also, by dispensing with the catch assembly of the previously described embodiment, the filter rings can be made thinner and with a larger internal diameter, thus allowing a wide viewing angle to be provided.

It is also possible to use a mixed or hybrid system, some filter rings having the quick release mechanism, and some being attached in the conventional way, for example using the interlocking stepped concentric rings, or being screwed one to another.

To maximize the viewing angle, the inner diameter of components could be increased with distance from the camera lens, but this would increase the manufacturing costs as more different components would have to be produced for different stages. Alternatively, the viewing angle can be maximized by giving all the components large inner diameters. This again increases costs since more material is required, and the size and weight of the matte box.

Instead, an alternative approach is to combine a fixed front ring having a large inner diameter with several quick release filter stages as previously described.

Figure 11:
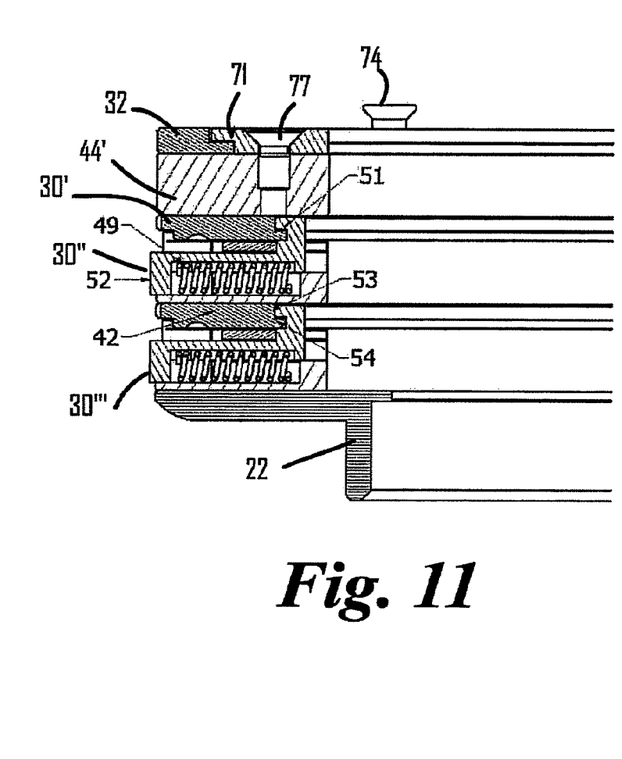
FIG. 11 shows a radial sectional view of a third embodiment of the matte box
Figure 12:
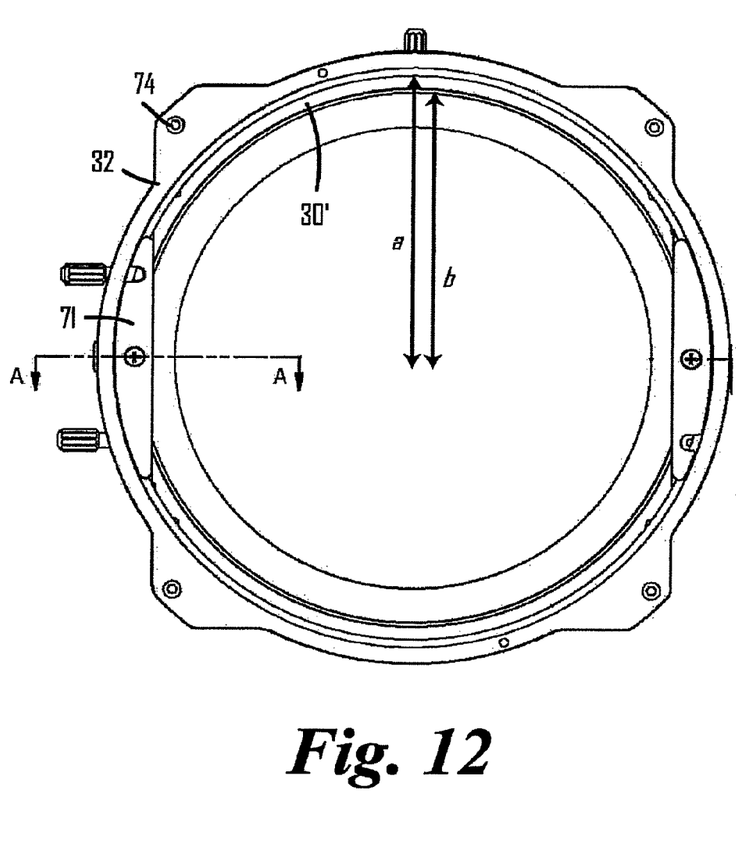
FIG. 12 shows a front elevation of the third embodiment of the matte box
Figure 14:
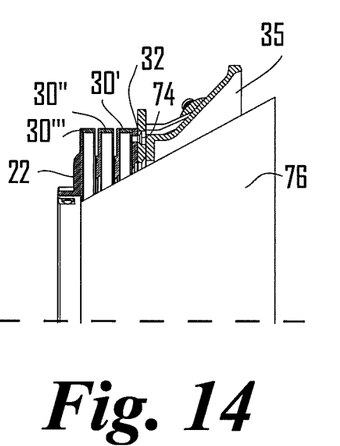
FIG. 14 shows a longitudinal sectional view of the third embodiment of the matte box.

Such a hybrid system is shown in FIGS. 11 and 12. A front plate 32 is attached to the sunshade 35 by screws 74 (the sunshade is shown in FIG. 14). The front filter ring stage 30' is secured to the front plate 32 by a locking segment 71 (which itself is attached to the filter guide 44' by screws 77), the front plate 32 and locking segment 71 having an interlocking rebated profile. Front filter ring stage 30' is still free to rotate with respect to the front plate 32 and sunshade 35, but the filter guide 71 fixes the front stage to the front plate 32, as it will be seen that the filter guide 71 does not include a quick-release type catch mechanism.

Subsequent filter stages 30", 30'" feature filter guides 44 having quick-release type catch mechanisms 51, having lips 54 which attach to the bore 53 of the first filter stages 30' and subsequent filter stages as previously described, so that filter stages may be added and removed easily.

The inner diameter of the front plate 32 indicated a in FIG. 12, is larger than the inner diameter of the filter ring 42 of the first or subsequent filter stages, indicated b, due to the use of a relatively simple locking segment 71 rather than a catch means 51.

Figure 13:
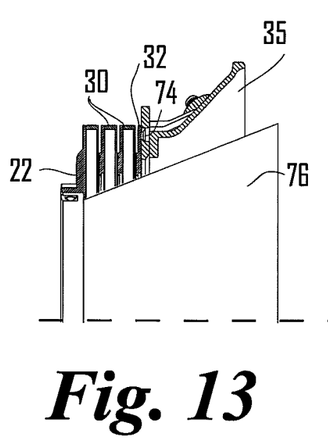
FIG. 13 shows a longitudinal sectional view of the first embodiment of the matte box

Referring to FIG. 13, which shows the fully quick-release assembly as previously described, where each filter stage 30 features a filter ring with the catch assembly on the filter guide, and the hybrid assembly shown in FIG. 14. The frontmost filter stage 30 is connected to a front plate 32, again by means of the quick release catch assembly, and the two parts may be rotated independently by means of the race and bearing mechanism previous described. The front plate is connected to the sunshade 35 by screws 74. The inner diameters of the filter stages 30 and the front plate 32 are equal. The donut ring 22 features a narrower rear-facing portion that interfaces with the camera's lens assembly, and has a similar inner diameter.

A conical viewing volume, designated 76, represents the field of view of the camera lens (the cone of course extends from the camera to infinity, to the right of the diagram). The size and angle of the conical viewing volume is determined by the diameter of the camera lens (which is beyond the user's control) and the inner diameter of the front plate 32. As previously discussed, it is desirable that the size and angle of this conical viewing volume, the viewing angle, is maximized.

Now referring to FIG. 14 and comparing it to FIG. 13, as previously described, the first, frontmost, filter ring 30' does not feature the quick release catch assembly. The front plate and the first filter stage have an increased inner diameter, so that the conical viewing volume 76 has a larger angle than the arrangement shown in FIG. 11, but the outer diameter of the filter stages has not been increased. Although the front filter stage is fixed to the front plate 32 and sunscreen 35, this filter stage and the other filter stages can still be disassembled using the quick release catch mechanism. A matte box will rarely have to be used with less than one filter, so in practice it is not a disadvantage that the front filter stage cannot be removed in a quick release type action.

The embodiments described here are principally intended for use with digital video and moving image cameras; however, filter stages have started to be used with still cameras, and the present invention is equally applicable to such cameras.

The present invention has been described with reference to a number of different embodiments. It is to be understood that the invention is not limited to the exact details of construction, operation, exact materials or embodiments shown and described, as obvious modifications and equivalents will be apparent to one skilled in the art. It is believed that many modifications and alterations to the embodiments disclosed will readily suggest themselves to those skilled in the art upon reading and understanding the detailed description of the invention. It is intended to include all such modifications and alterations insofar as they come within the scope of the present invention.

The invention claimed is:

1. A matte box system for a camera, including one or more filter rings each capable of accommodating a filter or filter holder,
   the filter rings each having a substantially planar forward face and a substantially planar rear face,
   one face having one or more bearing elements and the other face having a corresponding bearing surface adapted to engage with the bearing element,
   the bearing surface including one or more circular or arcuate channels, and
   the bearing element including a spring-loaded or otherwise biased surface that protrudes from the face and is urged in a generally axial direction to engage with the bearing surface such that the bearing surface and bearing element of consecutive filter rings allow the filter rings to independently rotate about the optical axis, while resisting radial movement of the filter rings:
   wherein the generally axial direction is substantially normal to the plane of the forward face;
   wherein the optical axis is substantially normal to the plane of the forward face; and
   wherein the spring-loaded or otherwise biased surface of the bearing element protrudes from the one face and is urged in the generally axial direction to engage with the bearing surface such that the bearing surface and bearing element of consecutive filter rings allow the filter rings to independently rotate about the optical axis while resisting radial movement of the filter rings.

2. A matte box according to claim 1 wherein the bearing element is a biased hemi-spherical surface, and the bearing surface is a race of hemi-spherical cross-section.

3. A matte box according to claim 1 wherein each filter ring also includes an outer rim segment which engages with the outer surface of an adjacent filter ring to assist in resisting radial movement of the filter rings.

4. A matte box according to claim 3 wherein the filter rings are held together solely by a brace extending from a back ring to a front ring or a sunshade.

5. A matte box according to claim 4 wherein the brace may be extended to discrete predetermined lengths corresponding to different numbers of filter stages.

6. A matte box according to claim 3 wherein the filter rings each having two catch means situated on opposite sides of the filter ring, each catch means including a moveable element that engages with an adjacent filter ring such that consecutive filter rings are releasably secured to each other.

7. A matte box according to claim 6 wherein a frontmost filter ring is provided which does not have the catch means, and which has a wider inner diameter than the filter ring or rings provided with two catch means.

8. A filter ring adapted for use in a matte box, comprising:
   a substantially planar forward face; and
   a substantially planar rear face;
   one face having one or more bearing elements;
   the other face having a corresponding bearing surface adapted to engage with the bearing element, the bearing surface including one or more circular or arcuate channels; and
   the bearing element including a spring-loaded or otherwise biased surface that protrudes from the one face and is urged in a generally axial direction substantially normal to the plane of the forward face to engage with the bearing surface such that the bearing surface and bearing element of consecutive filter rings allow the filter rings to independently rotate about an optical axis of the matte box, while resisting radial movement of the filter rings:
   wherein the optical axis is substantially normal to the plane of the forward face; and
   wherein the spring-loaded or otherwise biased surface of the bearing element protrudes from the one face and is urged in the generally axial direction to engage with the bearing surface such that the bearing surface and bearing element of consecutive filter rings allow the filter rings to independently rotate about the optical axis while resisting radial movement of the filter rings.

9. A filter ring according to claim 8 wherein the bearing element is a biased hemi-spherical surface, and the bearing surface is a race of hemi-spherical cross-section.

10. A filter ring according to claim 9, comprising an outer rim segment adapted to engage with an outer surface of an adjacent filter ring to assist in resisting relative radial movement of the filter rings.

11. A filter ring according to claim 10, comprising two catch means situated on opposite sides of the filter ring, each catch means including a moveable element that engages with an adjacent filter ring to releasably secure consecutive filter rings to each other.

12. A filter ring according to claim 9, comprising two catch means situated on opposite sides of the filter ring, each catch means including a moveable element that engages with an adjacent filter ring to releasably secure consecutive filter rings to each other.

13. A filter ring according to claim 8, comprising an outer rim segment adapted to engage with an outer surface of an adjacent filter ring to assist in resisting relative radial movement of the filter rings.

14. A filter ring according to claim 13, comprising two catch means situated on opposite sides of the filter ring, each catch means including a moveable element that engages with an adjacent filter ring to releasably secure consecutive filter rings to each other.

15. A filter ring according to claim 8, comprising two catch means situated on opposite sides of the filter ring, each catch means including a moveable element that engages with an adjacent filter ring to releasably secure consecutive filter rings to each other.

* * * * *